United States Patent

[11] 3,581,048

[72] Inventor Stephen V. Leonardo
 1128 Blanchard St., Downers Grove, Ill. 60515
[21] Appl. No. 848,584
[22] Filed Aug. 8, 1969
[45] Patented May 25, 1971

[54] WELDED MEMBER
 1 Claim, 9 Drawing Figs.
[52] U.S. Cl. ................................................... 219/93
[51] Int. Cl. ............................................. B23k 11/14
[50] Field of Search .......................................... 219/93, 94, 106, 107, 117

[56] References Cited
UNITED STATES PATENTS
1,040,418 10/1912 Rietzel ......................... 219/106
1,330,468 2/1920 Hill ............................... 219/107

Primary Examiner—J. V. Truhe
Assistant Examiner—J. G. Smith
Attorney—James R. McKnight ABSTRACT: My metal crotch weldment is L-shaped and bent to form substantially horizontal and vertical portions, each with nibs adapted to be spot welded to the substantially horizontal and vertical portions of a bent metal tubing. When my L-shaped crotch weldment is positioned with the nibs against the substantially horizontal and vertical portions of a bent tubing and an active electric spot welder is applied to said weldment, the heat therefrom to the nibs causes the nibs to flow into fusion with said portions for retaining the portions of the tubing in fixed spaced position.

PATENTED MAY 25 1971 3,581,048
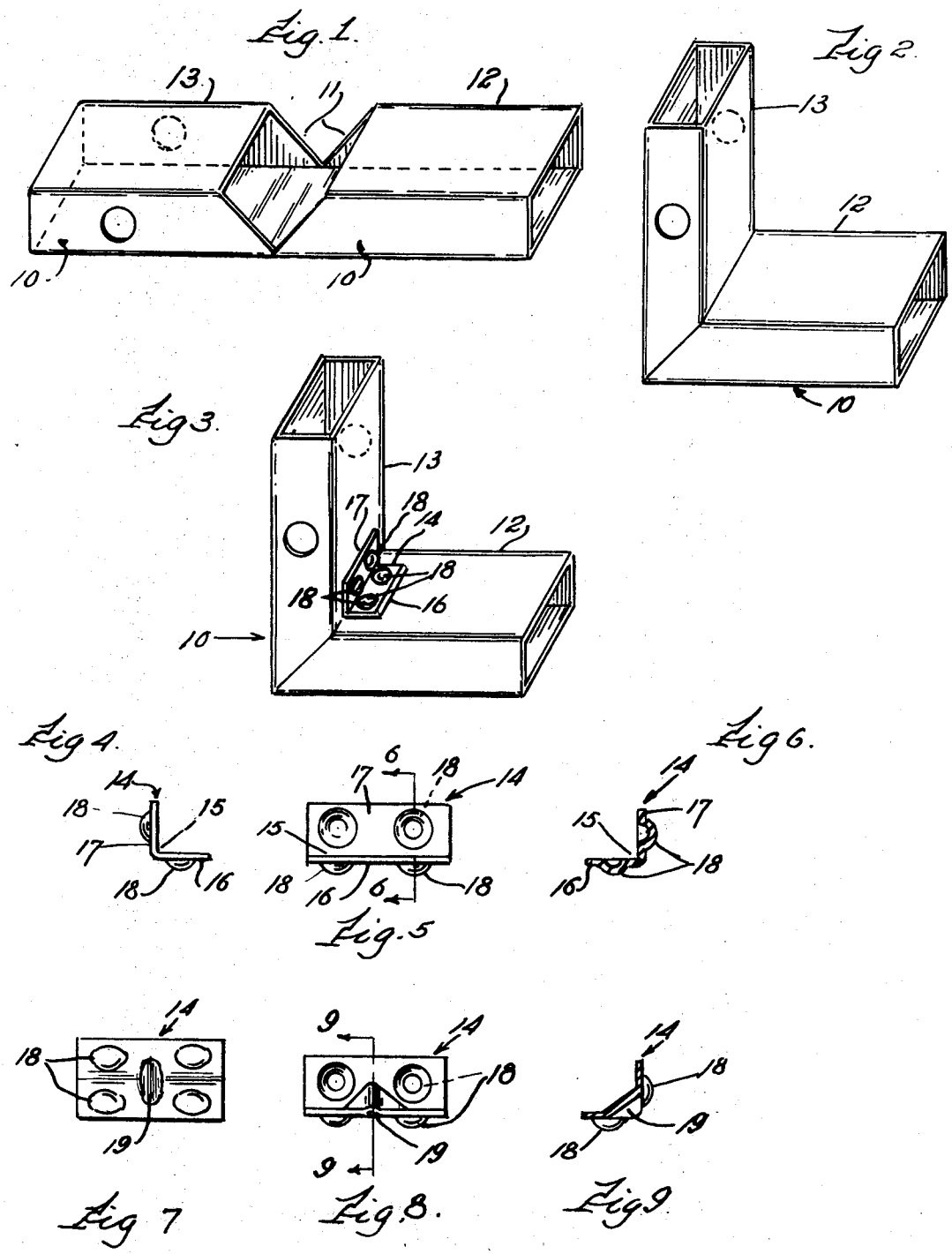
Inventor.
Stephen V. Leonardo
by James R. McKnight
Attorney.

WELDED MEMBER

This invention relates to a metal crotch weldment for securing bent portions of metal tubing in desired fixed position.

Heretofore, when it was desired to hold portions of bent metal tubing in fixed position, it was necessary to use arc welding or brazing. This was expensive and time consuming. An object of my invention is to eliminate arc welding or brazing and obtain substantially the same results.

It is among the objects of this invention to provide a crotch weldment with nibs positioned adjacent the joining of bent portions of tubing and electrically spot welded to said portions of bent tubing to hold them in fixed position. My crotch weldment is successful and secure in operation and economical and quick in use.

My invention also contemplates such other objects, advantages and capabilities as will later more fully appear and which are inherently possessed by my invention.

While I have shown in the accompanying drawings preferred embodiments of my invention, yet it is to be understood that the same are susceptible of modification and change without departing from the spirit of my invention.

Referring to the drawings, FIGS. 1 and 2 are perspective views of a tubing in straight and bent positions; FIG. 3 is a perspective view of my weldment in position on a bent tubing; FIG. 4 is an enlarged end view, and FIG. 5 a face view of my weldment; FIG. 6 is a sectional view on line 6—6 of FIG. 5; FIG. 7 is a bottom view; FIG. 8 is a face view of a modified form of my clip; and FIG. 9 is a sectional view on line 9 of FIG. 8.

The embodiment selected to illustrate my invention comprises a metal tubing 10 preferably of cold-rolled steel, having a notch 11 and bent at said notch substantially at right angles to form a substantially horizontal portion 12 and a substantially vertical portion 13.

I provide an economical, quick and practical holding of these portions in desired position by the use of my clip 14. This clip, preferably of steel, is L-shaped and is bent inwardly at bend 15 to form spaced substantially horizontal and vertical portions 16 and 17 substantially at right angles to each other. Each of portions 16 and 17 has spaced raised nibs 18, the number dependent upon the size of the portions.

In one form of my clip 14, I provide centrally of bend 15 a depressed reinforcing rib 19 for added strength.

In use, I position my clip 14, with nibs 18, against tubing 10, so that portion 16 is against horizontal portion 12 and portion 17 is against vertical portion 13.

I then apply an electrical spot welder against clip 14, which sends electrical impulses through the metal and heats nibs 18 to reach a plastic state and fuse with portions 12 and 13 of the metal tubing 10. This provides a crotch weldment for securing portions 12 and 13 in desired spaced position.

Having thus described my invention, I claim:

1. A welded member comprising a metal tubing of cold-rolled steel having a notch and bent at said notch substantially at right angles to provide a substantially flat horizontal portion and a substantially flat vertical portion, a weldment clip of steel, said weldment being L-shaped and bent substantially at right angles to form a substantially flat horizontal portion and a substantially flat vertical portion, with a plurality of spaced raised nibs provided in each of said portions, said horizontal portion of said weldment with its raised nibs positioned against said horizontal portion of the tubing and said vertical portion of said weldment with its raised nibs positioned against said vertical portion of the tubing, said weldment is welded to the tube by an electric spot weld, the nibs being fused with the horizontal and vertical portions of the tubing whereby the portions of the tubing are held with respect to each other in a fixed right-angle position.